Patented Dec. 26, 1950

2,536,008

UNITED STATES PATENT OFFICE 2,536,008

PEROXY-SUBSTITUTED PERSULFONATES

Frederick F. Rust, Oakland, and Alan R. Stiles and William E. Vaughan, Berkeley, Calif., assignors to Shell Development Company, San Francisco, Calif., a corporation of Delaware No Drawing. Application February 21, 1949, Serial No. 77,693

7 Claims. (Cl. 260—456)

This invention relates to esters of persulfonic acids in which one or more persulfo groups (—SO₂—O—O—H) replace hydrogen atoms of an organic peroxide. The invention provides a series of valuable new compounds, a particularly versatile class of which are the tertiary-hydrocarbon esters of persulfonic acids in which a persulfo group replaces a hydrogen atom of a di-tertiary-hydrocarbon peroxide, or of its halogen-analog containing one or more chlorine or bromine atoms.

This application is a continuation-in-part of our copending application Serial No. 792,840, filed December 19, 1947 and now Patent No. 2,519,403 issued August 22, 1950. Our earlier filed application describes and claims a novel reaction process by which certain organic peroxides can be sulfohalogenated to form the novel peroxidic sulfonyl halides, which are also described and claimed therein. This application described and claims the class of novel compounds which can be prepared by contacting such sulfonyl halides with a salt of a hydroperoxide under conditions conducive to the precipitation of inorganic salt. However, like any other organic compounds, the compounds provided by the present invention can be synthesized by other methods.

In general, the —O—O— grouping in an organic molecule is so unstable that a compound containing it, if it reacts under a given set of conditions, undergoes a reaction involving the bonds of this grouping. We have now discovered, however, that when the grouping is contained between two tertiary carbon atoms, not only can the compound be sulfohalogenated, but derivatives of the sulfonyl halide can be formed, and such derivatives exhibit both the chemical properties characteristic of the derivative and of the particularly stable class of peroxides.

The compounds provided by the invention are peroxides, having the formula R—O—O—R where each R is an organic radical the first atom of which (the atom attached to oxygen) is a saturated carbon atom (linked to four other atoms by single bonds), in which peroxide at least one hydrogen atom is replaced by a group having the formula —SO₂—O—O—R where R is an organic radical the first atom of which is a saturated carbon atom. These compounds are polyfunctional and exhibit the properties characteristic of organic peroxides of the formula R—O—O—R as well as properties characteristic of esters of persulfonic acids. They are particularly valuable in that they provide a means of greatly extending the existing knowledge of peroxidic compounds, and make available compounds containing two groups having totally different structures and properties, both of which are thermally decomposable into organic free radicals. In addition to their direct commercial value as initiators of free radical reactions (illustrated by the fact that the presence of a small amount of tertiary-butyl 2-tertiary-butylperoxy-2-methylpropanepersulfonate in a suspension of vinyl chloride under conditions conducive to a peroxide initiated polymerization resulted in the formation of polyvinyl chloride), these compounds are peroxidic materials of a structure totally different from any peroxidic materials heretofore known and provide one means of extending the existing knowledge about peroxidic materials.

Examples of the compounds provided by the invention include aliphatic compounds such as ethyl 2-tertiary-butyl-2-methyl-propanepersulfonate, bis(tertiary-butylperoxysulfo-tertiary-butyl) peroxide, and 1-methylcyclohexyl 2-tertiary-amylperoxy-2-methylbutanepersulfonate; aromatic compounds such as ethyl 2-(α,α-dimethylbenzylperoxy)-2-phenylpropanepersulfonate, tertiary-butyl 2-tertiary-amylperoxy-2-phenylpropanepersulfonate and α,α-dimethylbenzyl 2-tertiary-butylperoxy-2-methylpropanepersulfonate; and halogen-containing compounds such as chloro-tertiary-butyl 2-(chloro-tertiary-butylperoxy)-2-methylpropanesulfonate, 1-methylcyclohexyl 2-tertiary-amylperoxy-2-chloromethylbutanesulfonate and propyl 2-(bromo-tertiary-butylperoxy)-2-methylpropanesulfonate.

The preferred method of producing the compounds provided by the invention comprises sulfochlorinating a peroxide having the formula

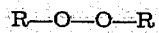

where each R is a tertiary-hydrocarbon radical or its halogen-analog containing one or more chlorine or bromine atoms, by the action of chlorine and sulfur dioxide in the presence of light (the process of our earlier application) and adding to the sulfochlorinated peroxide in the substantial absence of water, an equivalent amount of an alkali metal salt of a hydroperoxide of the formula

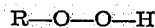

where R is a tertiary-hydrocarbon radical or its halogen-analog containing one or more chlorine or bromine atoms. We have found that in this method of synthesis the following equations (illustrated by the reactions of di-tertiary-butyl peroxide and the sodium salt of tertiary-butyl hydroperoxide, using, in each case, equivalent amounts of the reactants) express substantially the only reactions by which the reactants are converted:

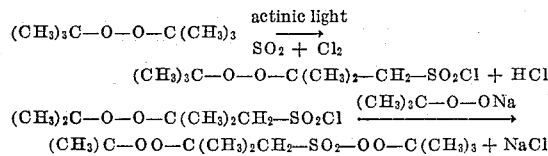

Because of their complex structure, names of the compounds provided by the invention do not convey a clear picture of the various molecules to the reader. Illustrative examples of the preferred class of such compounds, tertiary-hydrocarbon (or their halogen-analogs containing one or more atoms of chlorine or bromine) esters of persulfonic acids in which a persulfo group replaces a hydrogen atom of a di-tertiary-hydrocarbon peroxide or of its halogen-analog containing one or more chlorine or bromine atoms, are more clearly represented as the reaction products of the monosulfochlorination products of the peroxides, including the following, with salts of hydroperoxides, including the following: di-tertiary-butyl peroxide, bis(chloro-di-tertiary-butyl) peroxide, di-tertiary-amyl peroxide, bromo-tertiary-amyl tertiary-butyl peroxide, bis($\alpha,\alpha$-dimethylbenzyl) peroxide (cumene peroxide) and bis(1-methylcyclohexyl) peroxide reacted with the sodium salt of tertiary-butyl hydroperoxide, tertiary-amyl hydroperoxide, bromo-tertiary-butyl hydroperoxide, $\alpha,\alpha$-dimethylbenzyl hydroperoxide, para-chloro-$\alpha,\alpha$-dimethylbenzyl hydroperoxide, and 1-methylcyclohexyl hydroperoxide.

The tertiary-alkyl esters of persulfonic acids in which a persulfo group replaces a hydrogen atom of a di-tertiary-alkyl hydroperoxide comprise a particularly preferred group of compounds provided by the invention.

The following examples illustrate in detail methods by which particular peroxy-substituted persulfonates can be produced. As many variations in the reactants and reaction materials are within its scope, the invention is not to be construed as limited to the particular compounds specified in the examples or to the materials produced by the particular reactions described therein.

*Example I*

A sulfonyl chloride suitable for conversion to a persulfonate provided by the present invention, is prepared by the following procedure. In a transparent reaction vessel 146 grams (1.0 mole) of di-tertiary-butyl peroxide is illuminated by a 500 watt lamp and maintained at from 6° C. to 80° C. A gaseous mixture of 0.3 mole of sulfur dioxide with 0.2 mole of chlorine is introduced over a period of 1.5 hours. The crude 2-tertiary-butyl-peroxy-2-methylpropane sulfonyl chloride is isolated by distilling off the dissolved gases and unreacted peroxide.

*Example II*

Tertiary-butyl 2-tertiary-butylperoxy-2-methylpropanepersulfonate is produced by dissolving 5 grams of tertiary-butyl chlorosulfonyl-tertiary-butyl peroxide in 20 cc. of ether and adding the resulting solution to 5 grams of the sodium salt of tertiary-butyl hydroperoxide suspended in 50 cc. of ether while maintaining the reactants, during the mixing, at 10° C. The persulfonate is isolated by extracting the reaction mixture with water, to remove the unconverted reactants and salt, drying with anhydrous sodium sulfate and distilling off the ether.

That the compounds provided by the invention have the indicated structure was demonstrated by analyzing a sample of tertiary-butyl 2-tertiary-butylperoxy-2-methylpropanesulfonate, prepared in the above manner from the crude sulfochlorination product of di-tertiarybutyl peroxide (prepared in the manner described in Example I), and separated from the mixed reaction products as indicated after they had been maintained at the reaction temperature for one hour. The following analysis indicated the product to have the formula $C_{12}H_{26}O_6S$ and the structure,

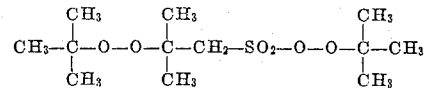

|  | Found | Theory for $C_{12}H_{26}O_6S$ |
|---|---|---|
| Per Cent Carbon | 48.0, 48.2 | 48.4 |
| Per Cent Hydrogen | 8.9, 8.8 | 8.7 |
| Per Cent Sulfur | 9.6, 9.5 | 10.7 |
| $n_D^{20}$ | 1.4350 |  |

It was found that employing a catalytic amount of this compound in an emulsion polymerization of vinyl chloride initiated the reaction.

*Example III*

$\alpha,\alpha$-Dimethylbenzyl 2-(chloro-tertiary-butylperoxy)-2-chloromethylpropanepersulfonate is prepared by dissolving 13 grams of 2-(chloro-tertiary-butylperoxy)-2-chloromethylpropane-sulfonyl chloride in 50 cc. of ether and adding the resulting solution to 10 grams of the sodium salt of cumyl hydroperoxide suspended in 100 cc. of ether while maintaining the reactants, during the mixing, at 15° C. The persulfonate is isolated by extracting the mixed reaction products with water, to remove the unconverted reactants and salt, drying and distilling off the ether.

The product has the formula,

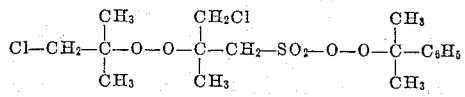

and decomposes, upon heating, into free radicals having a variety of structures.

*Example IV*

Tertiary-butyl 2-($\alpha,\alpha$-dimethylbenzylperoxy)-2-phenylpropanepersulfonate is prepared by dissolving 18 grams of 2-($\alpha,\alpha$-dimethylbenzylperoxy)-2-phenylpropanesulfonyl chloride in 100 cc. of ether and adding the resulting solution to 5 grams of the sodium salt of tertiary-butyl hydroperoxide suspended in 50 cc. of ether while maintaining the reactant, during mixing, at 10° C. The persulfonate is isolated by extracting the mixed reaction products with water to remove the unconverted reactants and salt, drying and distilling off the ether.

The product has the formula,

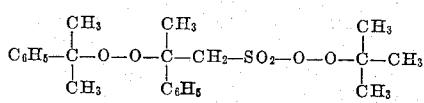

and decomposes, upon heating, into free radicals having a variety of structures.

The invention claimed is:

1. Tertiary-butyl 2-tertiary-butylperoxy-2-methylpropanepersulfonate.

2. Alpha,alpha-dimethylbenzyl 2-(chloro-tertiary-butylperoxy)-2-chloromethylpropanepersulfonate.

3. Tertiary-butyl 2-(alpha,alpha-dimethylbenzylperoxy)-2-phenylpropanepersulfonate.

4. A tertiary-alkyl ester of a persulfonic acid in which the persulfo group replaces a hydrogen atom of a di-tertiary-alkyl peroxide.

5. An ester in which an organic radical, the first atom of which is a saturated carbon atom, replaces the ionizable hydrogen atom of a persulfonic acid, in which acid the persulfo group replaces a hydrogen atom of an organic peroxide containing the peroxy group directly connected to two saturated carbon atoms and of the class consisting of the hydrocarbon peroxides and the halogen-substituted hydrocarbon peroxides.

6. An ester of a persulfonic acid in which at least one persulfo group replaces a hydrogen atom of an organic peroxide containing the peroxy group directly connected to two saturated carbon atoms and of the class consisting of the hydrocarbon peroxides and the halogen-substituted hydrocarbon peroxides.

7. An ester of a persulfonic acid, in which acid the persulfo group replaces a hydrogen atom of an organic peroxide wherein the peroxy group is directly connected to two hydrocarbon groups containing tertiary carbon atoms by bonds to tertiary carbon atoms, in which ester a hydrocarbon group containing a tertiary carbon atom is directly linked to the peroxy group of the esterified persulfo group by a bond from a tertiary carbon atom.

FREDERICK F. RUST.
ALAN R. STILES.
WILLIAM E. VAUGHAN.

REFERENCES CITED

The following references are of record in the file of this patent:

UNITED STATES PATENTS

| Number | Name | Date |
| --- | --- | --- |
| 2,467,280 | Walter | Apr. 12, 1949 |